April 21, 1936. C. B. McKNIGHT Re. 19,939

TIRE AND WHEEL CONSTRUCTION

Original Filed Aug. 9, 1932

INVENTOR
CLARENCE B. McKNIGHT

BY R. H. Barlow
ATTORNEY

Reissued Apr. 21, 1936 Re. 19,939

UNITED STATES PATENT OFFICE 19,939

TIRE AND WHEEL CONSTRUCTION

Clarence B. McKnight, Los Angeles, Calif.

Original No. 1,938,603, dated December 12, 1933, Serial No. 628,033, August 9, 1932. Application for reissue December 11, 1935, Serial No. 54,962

20 Claims. (Cl. 152—9)

This invention relates to improvements in tires for vehicle wheels.

More particularly the invention has to do with a wheel part engageable with a wheel body, to which no claim is made per se, it being an object of this invention to provide a wheel part of such construction as to render it applicable to either an old or a new vehicle wheel.

A further object of the invention is to provide a puncture proof tread for a wheel which possesses the resilient features of a pneumatic tire.

A further object of the invention is to provide a tread for a wheel whereby slippage is reduced and traction is increased.

A further object of the invention is to provide a plurality of circumferentially spaced diametrical sockets, cavities, or the like in the rim or felly which have a portion of their adjacent walls intersecting and forming communicating passages whereby a plug in one socket may be vulcanized or otherwise secured to a plug in another socket.

Other objects and features of the invention, of an interesting and important character, will hereinafter appear.

In the drawing, Fig. 1 is a side view, partly in elevation and partly in section of the structure embodied in the invention.

Figure 1:
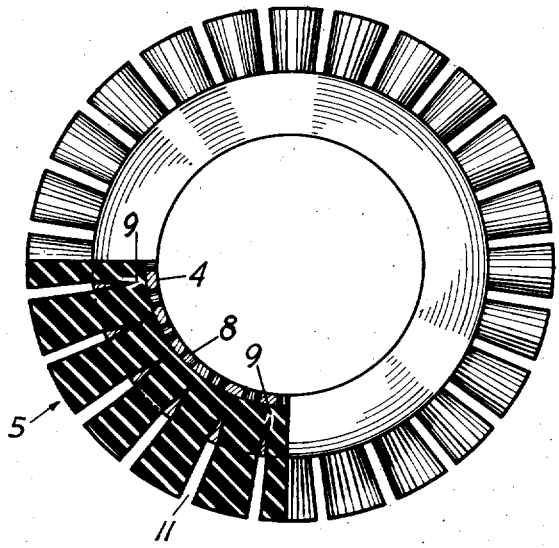

Referring in detail to the drawing, 4 designates the rim or felly of the wheel and 5, the plug or tread part thereof.

Figure 2:
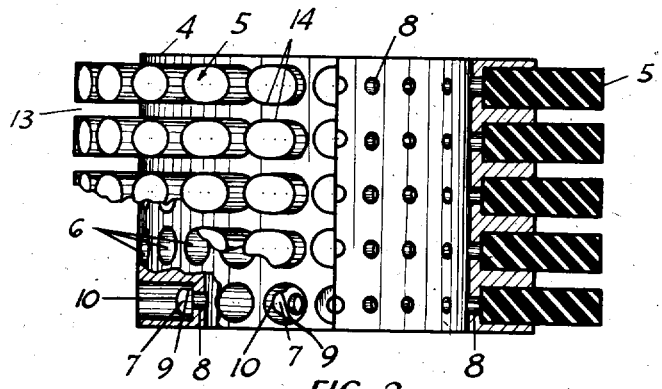
Fig. 2 is a face view showing a part of the tread portion of the wheel, a portion of the rim with the tread removed, and a radial section taken through the tread and rim.

The rim 4 is provided with circumferential rows of spaced cylindrically shaped openings or apertures 6, which extend radially from the outside face of the rim into it a sufficient distance until at least a portion of their adjacent walls intersect so as to form communicating passages 7 (see Fig. 2) whereby one plug may be vulcanized to the other. Each of said plugs 5 is diametrically opposite to a corresponding plug at the other side of the wheel.

There is, opposite to each plug, a hole 8 of lesser diameter than that of said apertures 6, said hole extending from the bottom of the aperture on through the rim. The holes 8 serve as vents to allow the escape of air from the openings 6 while the plugs are being inserted. They also serve for the insertion of a tool whereby any plug may be removed from its socket.

At each point 9, where the adjacent walls of the openings 6 intersect, there is formed a meeting edge 10. These edges are of a sharp character and serve as a means whereby the vulcanized parts of the adjoining plugs may be separated when it is desired to apply a tool in the hole 8 for the purpose of removing a plug from the rim.

The plugs 5 are preferably constructed of a resilient material and so spaced that when they make ground contact the clearance on the circumference will be such as to permit a slight compressibility whereby the adjacent sides of the plugs may be brought into contact when the tire assumes its load, owing to the decrease in length and corresponding increase of diameter of each plug. The normal clearance between the adjacent walls of the plugs on the circumferential spacing, is indicated by the numeral 11. In order for these walls to be parallel or this clearance to be maintained constant, other than when the plug is compressed, the portions 12 of the plug throughout its extent beyond the outer face of the rim are constructed with a diverging taper and therefore they are parallel with one another when the plugs are inserted in the rim.

The transverse clearance 13 between the rows of plugs should be substantially the same as the clearance afforded by the circumferential spacing already described. However the walls 14 forming the adjacent sides of the plugs transversely of the wheel rim, are constructed straight from end to end. Thus when the tire assumes its load and the plugs are compressed, their adjacent surfaces will be brought into abutting relation. At such time, there will, however, be a multiplicity of open spaces, each of which is bounded by the outer end portions of four adjacent plugs.

Figure 3:
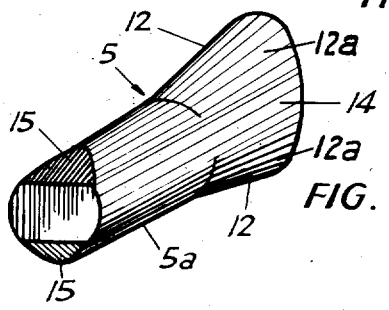
Fig. 3 is a perspective view of one of the tread plugs.

Speaking of the plug 5 as an article of manufacture, said plug as shown in detail in Fig. 3, comprises a cylindrical shank portion 5*a*, which is provided at one end with diametrically opposite bevels 15 and which is continued at its other end to form an outer portion which progressively increases in its cross-sectional extent, this latter portion having diametrically opposite bulged portions 12*a* the thickness of each bulged portion increasing to the outer end of the plug.

I claim:

1. A tire and wheel construction comprising a rim provided with a plurality of perforations a portion of the peripheral walls of which intersect to form communicating passages therebetween, and a plurality of plugs seated in said perforations.

2. A tire and wheel construction comprising a rim provided with a plurality of receptacles a portion of the peripheral walls of which intersect at points adjacent their bottoms thus forming communicating passages therebetween, there being for each receptacle an aperture of lesser diameter than that of said receptacle extending from its bottom on through said rim, and a plurality of plugs seated in said receptacles.

3. A tire and wheel construction comprising a rim provided with a plurality of cylindrical holes, and a plurality of rubber plugs inserted in said holes, there being in the inner side of said rim, an aperture communicating with one of said holes, the adjacent peripheral walls of said holes intersecting at points intermediate their extremities so as to form communicating chambers therebetween whereby one plug is vulcanized to the other.

4. A tire and wheel construction comprising a rim provided with a plurality of cylindrical cavities, said cavities having a portion of their peripheral walls intersecting at points intermediate their extremities so as to form meeting edges whereby one cavity communicates with the other throughout the circumferential series, there being vents for said cavities, and a plurality of rubber plugs vulcanizable together where the adjacent surfaces meet when seated in said cavities.

5. A tire and wheel construction comprising a rim provided with circumferential series of radially extending sockets, a portion of the peripheral walls of which intersect intermediate their extremities so as to form communicating passages between adjacent sockets, and a plurality of resilient plugs seated in said sockets.

6. A tire and wheel construction comprising a rim provided with a plurality of cylindrical sockets arranged in circumferentially spaced relation whereby a portion of their adjacent peripheral walls intersect, and a plurality of compressible plugs seated in said sockets and vulcanized together where they meet.

7. A tire and wheel construction having a plurality of spaced radially drilled sockets and a plurality of plugs seated in said sockets, said sockets being so drilled that the wall of one socket intersects with the wall of another socket thus having communicating walls between sockets whereby one plug may be fastened to the other.

8. A tire and wheel construction having a plurality of sockets, a plurality of rubber plugs seated in said sockets, said sockets having a portion of the peripheral walls intersecting so as to form meeting edges whereby one plug may be severed from the other.

9. A wheel part provided with a plurality of sockets having a portion of the peripheral walls intersecting so as to form meeting edges and a tread for said part comprising plugs extending into said sockets and joined together where said meeting edges occur.

10. A tire having in combination a rim provided with a plurality of perforations a portion of the peripheral walls of which intersect so as to form passages connecting one perforation with another, and tread plugs seated in said perforations each having a cylindrically shaped shank portion, said shank portion having at one end oppositely disposed bevels which taper that end of the shank in one of its diameters, the opposite end of said plug, being continued as a body which has bulges at diametrically opposite sides, said bulges increasing as they approach the end of said body farthest from said shank, said plugs having their beveled surfaces vulcanized together where they meet.

11. As an article of manufacture, a tread plug having a cylindrically shaped shank portion one end of which is continued as a body which has bulges at diametrically opposite sides, said bulges increasing as they approach the end of said body farthest from said shank.

12. As an article of manufacture, a tread plug having a cylindrically shaped shank portion, said shank portion having at one end oppositely disposed bevels which taper that end of the shank in one of its diameters, the opposite end of said plug being continued as a body which has bulges at diametrically opposite sides, said bulges increasing as they approach the end of said body farthest from said shank.

13. As an article of manufacture, a tread plug having a cylindrically shaped shank portion, said shank portion having at one end opposite disposed bevels which taper that end of the shank in one of its diameters, the opposite end of said plug being continued as a body which has bulges at diametrically opposite sides, said bulges increasing as they approach the end of said body farthest from said shank, said bulges and said bevels being located on the same diameter.

14. A resilient tread plug for tires, having a body portion and an integral shank portion extending from one end thereof, the diametrically opposite sides of said body portion tapering divergently from the junction of the body and shank portions towards the other end of the body portion.

15. A resilient tread plug for tires, having a body portion and an integral shank portion extending from one end thereof, the diametrically opposite sides of said body portion tapering divergently from the junction of the body and shank portions towards the other end of the body portion, the free end of the shank having oppositely disposed bevels which taper that end of the shank in one of its diameters.

16. A resilient tread plug for tires, having a body portion and an integral shank portion extending from one end thereof, the diametrically opposite sides of said body portion tapering divergently from the junction of the body and shank portions towards the other end of the body portion, the free end of the shank having oppositely disposed bevels which taper that end of the shank in one of its diameters, said tapering sides and said bevels being located on the same diameter.

17. A tire having in combination a rim provided with a plurality of perforations a portion of the peripheral walls of which intersect so as to form passages connecting one perforation with another, and a plurality of resilient tread plugs, each having a body portion and an integral shank portion extending from one end thereof, the diametrically opposite sides of said body portion tapering divergently from the junction of the body and shank portions toward the other end of the body portion, and the free end of each shank having oppositely disposed bevels which taper that end of the shank in one of its diameters, said shanks being seated one in each of said perforations to dispose the bevels of adjacent shanks in meeting relation within said passageways, said shanks having their beveled surfaces vulcanized together where they meet.

18. A tire having in combination a rim provided with a plurality of perforations, and a plurality of resilient tread plugs, each having a body portion and an integral shank portion extending from one end thereof, the diametrically opposite sides of said body tapering divergently from the junction of the body and shank portions toward the other end of the body portion, said shanks being seated one in each of said perforations, and means at the end of each of the shanks cooperating with the rim to hold the plugs against longitudinal displacement outwardly through the perforations.

19. A tire having in combination a rim provided with a plurality of perforations, and a plurality of resilient tread plugs, each having a body portion and an integral shank portion extending from one end thereof, the diametrically opposite sides of said body tapering divergently from the junction of the body and shank portions toward the other end of the body portion, said shanks being seated one in each of said perforations, an inwardly facing shoulder on the rim about said perforations, and means at the inner ends of said shank portions underlying said shoulders to hold the plugs against longitudinal displacement outwardly through the perforations.

20. A tire having in combination a rim, a plurality of resilient tread plugs mounted on the rim with their axes extending radially with respect thereto, said plugs being spaced circumferentially about the rim to bring their side faces into spaced opposition with one another, the opposed side faces adjacent plugs extending in substantial parallelism at their outer ends whereby the spacing between said faces remains substantially equal irrespective of end wear of the plugs.

CLARENCE B. McKNIGHT.